US012630746B2

(12) United States Patent
Gillgren et al.

(10) Patent No.: US 12,630,746 B2
(45) Date of Patent: May 19, 2026

(54) PAPER PRODUCT FOR FLOW WRAPPING

(71) Applicant: Billerud Aktiebolag (publ), Solna (SE)

(72) Inventors: Thomas Gillgren, Orebro (SE); Johan Larsson, Gavle (SE)

(73) Assignee: Billerud Aktiebolag (publ), Solna (SE)

( * ) Notice: Subject to any disclaimer, the term of this patent is extended or adjusted under 35 U.S.C. 154(b) by 418 days.

(21) Appl. No.: 18/246,843

(22) PCT Filed: Sep. 27, 2021

(86) PCT No.: PCT/EP2021/076532
§ 371 (c)(1),
(2) Date: Mar. 27, 2023

(87) PCT Pub. No.: WO2022/064048
PCT Pub. Date: Mar. 31, 2022

(65) Prior Publication Data
US 2023/0303890 A1 Sep. 28, 2023

(30) Foreign Application Priority Data
Sep. 28, 2020 (EP) ..................................... 20198767

(51) Int. Cl.
*C09J 7/29* (2018.01)
*B65D 65/42* (2006.01)
(Continued)

(52) U.S. Cl.
CPC ................ *C09J 7/29* (2018.01); *B65D 65/42* (2013.01); *C09J 5/00* (2013.01); *D21H 11/04* (2013.01);
(Continued)

(58) Field of Classification Search
CPC .......... C09J 7/29; C09J 5/00; C09J 2400/283; B65D 65/42; B65D 75/44; D21H 11/04;
(Continued)

(56) References Cited

U.S. PATENT DOCUMENTS

2019/0203423 A1 7/2019 Niemi
2020/0190741 A1* 6/2020 Turkki ................... D21H 27/10

FOREIGN PATENT DOCUMENTS

EP 3168362 A1 5/2017
EP 3202979 A1 * 8/2017 ............. D21H 11/04
EP 3301221 A1 4/2018

OTHER PUBLICATIONS

[NPL-1] Bollström, R.; Tuominen, M.; Määttänen, A.; Peltonen, J.; Toivakka, M.; "Top layer coatability on barrier coatings"; Progress in Organic Coatings 73 (2012), pp. 26-32. (Year: 2012).*
(Continued)

*Primary Examiner* — Donald M Flores, Jr.
(74) *Attorney, Agent, or Firm* — Stites & Harbison PLLC; Richard S. Myers, Jr.

(57) ABSTRACT

The present disclosure provides a coated paper product for use in a flow wrapping process, wherein: —said coated paper product comprises a paper substrate; —said paper substrate is a machine-glazed (MG) kraft paper having a glazed side and a non-glazed side; —said non-glazed side is coated with a precoating layer and a barrier coating layer; —said precoating layer comprises a polymeric binder and a pigment; and —the contact angle measured according to TAPPI T 558 between water and a surface formed by the barrier coating layer is less than 90° at the 1.0 s checkpoint.

17 Claims, 1 Drawing Sheet

(51) Int. Cl.

| | |
|---|---|
| *C09J 5/00* | (2006.01) |
| *D21H 11/04* | (2006.01) |
| *D21H 19/82* | (2006.01) |
| *D21H 19/84* | (2006.01) |
| *D21H 21/16* | (2006.01) |
| *D21H 27/10* | (2006.01) |

(52) U.S. Cl.
CPC ........... *D21H 19/826* (2013.01); *D21H 19/84* (2013.01); *D21H 21/16* (2013.01); *D21H 27/10* (2013.01); *C09J 2400/283* (2013.01); *Y10T 428/24355* (2015.01)

(58) Field of Classification Search
CPC ...... D21H 19/826; D21H 19/84; D21H 21/16; D21H 27/10; D21H 19/80; D21H 19/828; D21H 21/50; D21H 21/52; D21H 25/04; Y10T 428/24355
See application file for complete search history.

(56) References Cited

OTHER PUBLICATIONS

Roger Bollstrm et al: "Top layer coatability on barrier coatings", Progress in Organic Coatings, Elsevier BV, NL, vol. 73, No. 1, Aug. 19, 2011 (Aug. 19, 2011), pp. 26-32.
Ek, Monica, Göran Gellerstedt, and Gunnar Henriksson, eds. Paper products physics and technology. vol. 4. Walter de Gruyter, 2009.
PTS Fibre based solutions; PTS Method PTS-RH 021/97; Oct. 2012, replaces version Sep. 1997; pp. 1-6.

\* cited by examiner

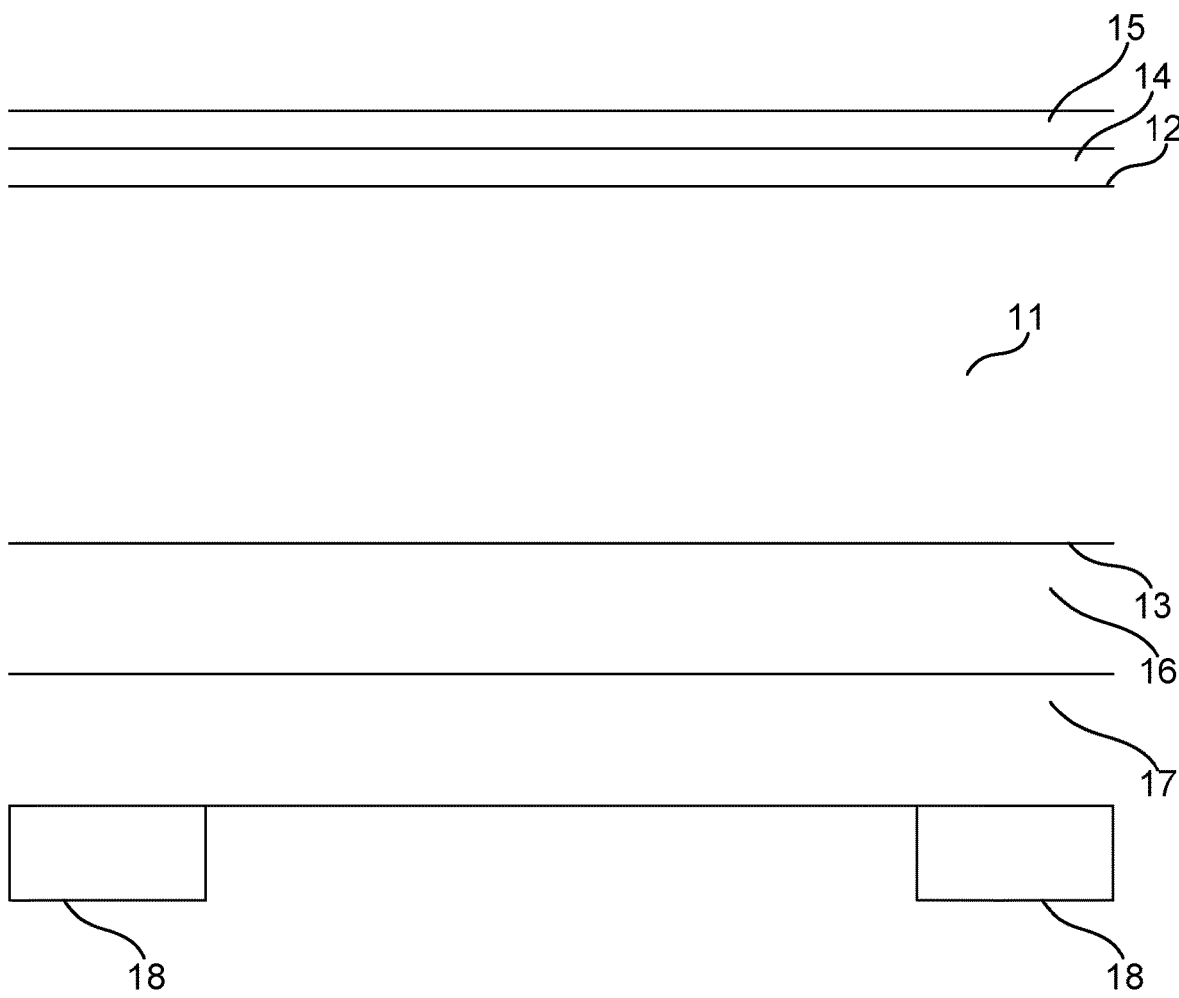

PAPER PRODUCT FOR FLOW WRAPPING

CROSS REFERENCE TO RELATED APPLICATIONS

This application is a § 371 National Phase Application of PCT/EP2021/076532 filed Sep. 27, 2021, which claims priority to EP20198767.4 filed Sep. 28, 2020.

TECHNICAL FIELD

The present disclosure relates to the field of paper-based materials.

BACKGROUND

Flow wrapping is a horizontal-motion process in which products of any shape are wrapped in a wrapping material. Traditionally, the wrapping material has been a clear plastic film or a printed opaque plastic film. The package resulting from the flow wrapping process has a longitudinal fin seal and end fin seals. The longitudinal fin seal is typically folded over so that the fin lies flat on the backside wall of the package rather than projecting from it.

SUMMARY

The present disclosure aims to provide a paper-based material that can replace plastic films used in flow wrapping processes. The inventors have realized that such a paper-based material, to be commercially successful, should meet most, preferably all, of the following criteria:

recyclable according to applicable standards;

satisfactory printability when using existing printing technology;

sealant layer adhesion (i.e. capable of binding a sealant composition applied in a high-speed process);

runnability in the flow wrapping process (a flow wrapping process is normally operated at high speed, which is tough on the packaging material);

protecting the packed/wrapped product from ambient moisture;

providing a grease barrier (preventing fat from the packed/wrapped product from staining and/or weakening the paper-based material); and acceptable cost of production, preferably on existing machinery or requiring only minor investments in new equipment.

Accordingly, the present disclosure provides the following listing of itemized embodiments:

1. A coated paper product for use in a flow wrapping process, wherein:

said coated paper product comprises a paper substrate;

said paper substrate is a machine-glazed (MG) paper, preferably a MG kraft paper, having a glazed side and a non-glazed side;

said non-glazed side is coated with a precoating layer and a barrier coating layer;

said precoating layer comprises a polymeric binder and a pigment; and the contact angle measured according to TAPPI T 558 between water and a surface formed by the barrier coating layer is less than 90° at the 1.0 s checkpoint.

2. The coated paper product of item 1, wherein the coat weight of the precoating layer is at least 5 g/m², such as 5-10 g/m², preferably 6-9 g/m².

3. The coated paper product of item 1 or 2, wherein the coat weight of the barrier coating layer is at least 5 g/m², such as 5-10 g/m², preferably 6-9 g/m².

4. The coated paper product of any one of the preceding items, wherein the grammage measured according to ISO 536:2020 of the paper substrate is 40-60 g/m², such as 42-55 g/m².

5. The coated paper product of any one of the preceding items, wherein the grammage measured according to ISO 536:2020 of the coated paper product is 56-76 g/m², such as 58-71 g/m².

6. The coated paper product of any one of the preceding items, wherein the thickness measured according to ISO 534:2011 of the paper substrate is 50-64 μm, such as 52-61 μm.

7. The coated paper product of any one of the preceding items, wherein the thickness measured according to ISO 534:2011 of the coated paper product is 55-70 μm, such as 57-67 μm.

8. The coated paper product of any one of the preceding items, wherein the density measured according to ISO 534:2011 of the paper substrate is 800-900 kg/m³.

9. The coated paper product of any one of the preceding items, wherein the density measured according to ISO 534:2011 of the coated paper product is 950-1100 kg/m³.

10. The coated paper product of any one of the preceding items, wherein the puncture force at break measured according to EN 14477 of the paper substrate is at least 2.3 N, preferably at least 2.5 N.

11. The coated paper product of any one of the preceding items, wherein the puncture force at break measured according to EN 14477 of the coated paper product is at least 2.4 N, preferably at least 2.6 N.

12. The coated paper product of any one of the preceding items, wherein the pigment is a platy pigment, such as platy clay.

13. The coated paper product of item 12, wherein the platy pigment has a form factor of at least 20, such as at least 30, such as at least 40.

14. The coated paper product of any one of the preceding items, wherein the dry weight ratio of pigment to binder in the precoating layer is between 100:40 and 100:90, such as between 100:60 and 100:85.

15. The coated paper product of any one of the preceding items, wherein the Bendtsen roughness according to ISO 8791-2:2013 of the glazed side of the paper substrate is below 90 ml/min, preferably 70 ml/min or lower, more preferably below 55 ml/min.

16. The coated paper product of any one of the preceding items, wherein the Bendtsen roughness according to ISO 8791-2:2013 of the non-glazed side of the paper substrate is below 600 ml/min, preferably 530 ml/min or lower, more preferably below 400 ml/min.

17. The coated paper product of any one of the preceding items, wherein the PPS roughness according to ISO 8791-4:2007 of the glazed side of the coated paper product is below 6.00 μm, such as below 5.00 μm, such as below 4.00 μm.

18. The coated paper product of any one of the preceding items, wherein the roughness measured according to ISO 8791-4:2007 of the glazed side of the paper substrate is below 7.00 μm, such as below 6.00 μm.

19. The coated paper product of any one of the preceding items, wherein the paper substrate is bleached, e.g. has an ISO Brightness according to ISO 2470 of at least 77.

20. The coated paper product of any one of the preceding items, wherein the tensile strength index measured according to ISO 1924-3:2005 of the paper substrate is at least 79.2 Nm/g in the machine direction (MD) and/or at least 45.8 Nm/g in the cross direction (CD).

21. The coated paper product of any one of the preceding items, wherein the tensile strength index measured according to ISO 1924-3:2005 of the coated paper product is at least 70.0 Nm/g in the machine direction (MD) and/or at least 41.0 Nm/g in the cross direction (CD).

22. The coated paper product of any one of the preceding items, wherein the stretch at break measured according to ISO 1924-3:2005 of the paper substrate is 1.4%-2.4% in the MD and/or 3.0%-5.0% in the CD.

23. The coated paper product of any one of the preceding items, wherein the stretch at break measured according to ISO 1924-3:2005 of the coated paper product is 1.5%-2.5% in the MD and/or at least 4.0-6.0% in the CD.

24. The coated paper product of any one of the preceding items, wherein the tensile energy absorption (TEA) index measured according to ISO 1924-3:2005 of the paper substrate is at least 0.9 $J/m^2$ in the MD and/or at least 1.3 $J/m^2$ in the CD.

25. The coated paper product of any one of the preceding items, wherein the tensile energy absorption (TEA) index measured according to ISO 1924-3:2005 of the coated paper product is at least 0.9 $J/m^2$ in the MD and/or at least 1.5 $J/m^2$ in the CD.

26. The coated paper product of any one of the preceding items, wherein the bending resistance measured according to 2493-1:2010 of the paper substrate is 15-30 mN in the MD and/or 8-22 mN in the CD, wherein the bending resistance is tested using a bending angle of 15° and a test span length of 10 mm.

27. The coated paper product of any one of the preceding items, wherein the bending resistance measured according to 2493-1:2010 of the coated paper product is 20-40 mN in the MD and/or 16-32 mN in the CD, wherein the bending resistance is tested using a bending angle of 15° and a test span length of 10 mm.

28. The coated paper product of any one of the preceding items, wherein the bending resistance index measured according to 2493-1:2010 of the paper substrate is 150-250 $Nm^6/kg^3$ in the MD and/or 75-155 $Nm^6/kg^3$ in the CD, wherein the bending resistance is tested using a bending angle of 15° and a test span length of 10 mm.

29. The coated paper product of any one of the preceding items, wherein the bending resistance index measured according to 2493-1:2010 of the coated paper product is 75-155 $Nm^6/kg^3$ in the MD and/or 60-120 $Nm^6/kg^3$ in the CD, wherein the bending resistance is tested using a bending angle of 15° and a test span length of 10 mm.

30. The coated paper product of any one of the preceding items, wherein the Cobb 60 s value measured according to ISO 535:2014 of the glazed side is 15-50 $g/m^2$, such as 17-30 $g/m^2$.

31. The coated paper product of any one of the preceding items, wherein at least 80 dry wt. % of the fibres used to form the paper substrate are never-dried.

32. A sealable material comprising a coated paper product according to any one of the preceding items and a sealant layer applied to part of the barrier-coated side of the coated paper product.

33. The sealable material according to item 32, further comprising a print that has been printed onto the glazed side of the coated paper product.

34. A packaging method comprising the steps of:
   a) applying a sealant layer to part of the barrier-coated side of a coated paper product according to any one of items 1-31 to obtain a sealable material; and
   b) flow-wrapping a product in the sealable material.

35. The packaging method of item 34, wherein step a) further comprises printing the glazed side of the coated paper product.

36. The packaging material of item 35, wherein the printing and the application of the sealant layer are carried out in the same machine.

37. A method of producing a coated paper product for use in a flow wrapping process, comprising the steps of:
   providing a paper substrate having an air permeance measured according to ISO 5636-5:2013 of at least 55 s, said paper substrate being a machine-glazed (MG) kraft paper having a glazed side and a non-glazed side;
   precoating the non-glazed side of to form a precoating layer comprising a polymeric binder and a pigment; and
   barrier-coating the precoating layer to form a barrier coating layer forming a surface,
wherein a contact angle measured according to TAPPI T 558 between water and the surface formed by the barrier coating layer is less than 90° at the 1.0 s checkpoint.

38. The method of item 37 comprising drying between the precoating step and the barrier-coating step.

BRIEF DESCRIPTION OF THE DRAWINGS

FIG. 1 illustrates an embodiment of the coated paper product of the present disclosure that has been printed and provided with a sealant layer. The paper substrate 11 is a MG paper having a glazed side 12 and a non-glazed side 13. The glazed side 12 is provided with a thin starch coating 14 for curl prevention. The glazed side 12 has also been printed with a print layer 15. The non-glazed side 13 has been coated with a precoating layer 16 comprising pigment and a polymeric binder and then a barrier coating layer 17. Part of the surface of the barrier coating layer 17 has been provided with a sealant layer 18 that allows for sealing selected portions of the material when forming a flow wrap package.

DETAILED DESCRIPTION

As a first aspect of the present disclosure, there is provided a coated paper product for use in a flow wrapping process.

The coated paper product comprises a paper substrate suitably has an air permeance measured according to ISO 5636-5:2013 of at least 55 s, preferably at least 65 s, such as at least 75 s. To obtain low air permeance, a machine-glazed (MG) paper is used as the paper substrate. In the production of MG papers, the air permeance can be controlled, primarily by controlling the degree of low consistency (LC) refining (a higher degree of LC refining results in a lower air permeance). However, excessive LC refining results in an often unacceptable energy consumption (the LC refining requires energy and the energy consumption in the drying section increases with increased LC refining). Hence a typical upper limit for the air permeance is 250 s. The MG paper may be calendered.

To provide strength, the MG paper is preferably a kraft paper. Excellent strength is generally obtained if at least 80%, preferably at least 90%, by dry weight of the fibres used to produce the MG paper are never-dried fibres. Consequently, the MG paper is preferably produced in an integrated pulp and paper mill.

In an embodiment, at least 50% by dry weight of the fibres used to produce the MG paper are virgin softwood fibres, which generally provide more strength than other fibres. In another embodiment, at least at least 80% by dry weight of the fibres used to produce the MG paper are virgin softwood fibres.

A number of relevant paper strength parameters have been identified.

The puncture force at break (measured according to EN 14477) of the paper substrate may be at least 2.3 N, preferably at least 2.5 N.

The tensile strength index (measured according to ISO 1924-3:2005) of the paper substrate may be at least 79.2 Nm/g in the machine direction (MD) and/or at least 45.8 Nm/g in the cross direction (CD). Typical upper limits may be 120 Nm/g in the MD and 70 Nm/g in the CD.

The tensile energy absorption (TEA) index (measured according to ISO 1924-3:2005) of the paper substrate may be at least 0.9 $J/m^2$ in the MD and/or at least 1.3 $J/m^2$ in the CD. Typical upper limits may be 1.5 $J/m^2$ in the MD and 2.0 $J/m^2$ in the CD.

To perform well in the flow wrapping process, the paper substrate is preferably neither too stiff nor too flappy. Hence, the bending resistance measured according to 2493-1:2010 of the paper substrate may be 15-30 mN in the MD and/or 8-22 mN in the CD. The indexed value (obtained by dividing by the cube of the grammage) may be 150-250 $Nm^6/kg^3$ in the MD and/or 75-155 $Nm^6/kg^3$ in the CD. In the present disclosure, the bending resistance is tested using a bending angle of 15° and a test span length of 10 mm.

A suitable grammage (measured according to ISO 536: 2020) for the paper substrate is 40-60 $g/m^2$, such as 42-55 $g/m^2$. A suitable thickness (measured according to ISO 534:2011) of the paper substrate is 50-64 μm, such as 52-61 μm. A suitable density (measured according to ISO 534: 2011) for the paper substrate is 800-900 $kg/m^3$.

The MG paper has a glazed side and a non-glazed side. The glazed side is the side that faced the yankee cylinder (a polished metal cylinder sometimes referred to as a MG cylinder) used for drying the paper web in the MG paper-making machine. The contact with the polished metal surface during drying makes the glazed side smoother than the non-glazed side.

The roughness (measured according to ISO 8791-4:2007 (PPS 1 MPa)) of the glazed side of the paper substrate is typically below 7.00 μm, preferably below 6.00 μm. A typical lower limit may be 2.00 μm.

The Bendtsen roughness (measured according to ISO 8791-2:2013) of the glazed side of the paper substrate is typically below 90 ml/min, preferably 70 ml/min or lower, more preferably below 55 ml/min. A typical lower limit may be 20 ml/min.

As explained above, the Bendtsen roughness (measured according to ISO 8791-2:2013) of the non-glazed side of the paper substrate is higher, but typically below 600 ml/min and preferably 530 ml/min or lower, more preferably below 400 ml/min. A typical lower limit may be 130 ml/min.

The MG paper is preferably bleached.

The non-glazed side of the paper substrate is coated with a precoating layer and a barrier coating layer. For the avoidance of doubt, the barrier coating layer is applied on top of the precoating layer. The precoating layer and the barrier coating layer are preferably dispersion coating layers.

The precoating layer, which also contributes to the barrier properties of the coated paper product, comprises a polymeric binder and a pigment. To facilitate the coating operation, the precoating layer typically further comprises a rheology modifier. For effective filling of the pores of the non-glazed side of the paper substrate, the coat weight of the precoating layer is preferably at least 5 $g/m^2$. A coat weight of more than 10 $g/m^2$ is typically not motivated and may also be difficult to apply. A preferred range for the coat weight of the precoating layer is 6-9 $g/m^2$.

An example of a suitable polymeric binder is a styrene-butadiene copolymer. Other examples are a styrene/acrylate copolymer and an ethylene acrylic acid copolymer.

To better contribute to the barrier properties, the pigment may be platy or even hyper-platy. Accordingly, the platy pigment has a form factor of at least 20, such as at least 30, such as at least 40. A typical upper limit for the form factor may be 200.

Examples of platy pigments are platy clay and platy talc. A platy clay having a form factor of above 40 is particularly preferred. An example of such a platy clay is Barrisurf LX from IMERYS.

For the purpose of obtaining barrier properties, the dry weight ratio of binder to pigment in the precoating layer is preferably at least 40:100. A dry weight ratio above 90:100 may, depending on the coating technique, complicate the coating operation. A suitable range for the dry weight ratio is from 60:100 to 85:100.

The barrier coating layer forms a surface to which it is intended to apply a sealant layer, typically a cold-sealant layer. To facilitate the application of the sealant layer, the contact angle between water and this surface is less than 90°, preferably less than 80°, such as less than 70°. The contact angle may be measured according to TAPPI T 558. This standard stipulates measuring the contact angle at different checkpoints. Suitably, the contact angle at the 1.0 s checkpoint is selected.

The coat weight of the barrier coating layer is preferably least 5 $g/m^2$, such as 5-10 $g/m^2$, more preferably 6-9 $g/m^2$. The barrier coating layer preferably comprises a polymer. In one embodiment, at least 25% of the dry weight of the barrier coating layer is polymeric material. To facilitate the coating operation, the barrier coating typically comprises a rheology modifier in addition to the polymer(s).

As shown below in the Examples section, satisfactory barrier properties have been obtained with a coated paper product according to the present disclosure. The water vapour transmission rate (WVTR) measured according to ISO 15106-1:2003 at 23° C. and 50% relative humidity (RH) is typically below 10 $g/m^2$*day and preferably below 6 $g/m^2$*day for the coated paper product. A typical lower limit may be 2 $g/m^2$*day. Under more challenging conditions, i.e. 30° C. and 80% RH, the WVTR measured according to ISO 15106-1:2003 is typically below 50 $g/m^2$*day and preferably below 35 $g/m^2$*day. The grease resistance (Palm Kernel Oil) measured according to ISO 16532-1:2008 is typically above 1500 min for the coated paper product.

A suitable grammage (measured according to ISO 536: 2020) the coated paper product is 56-76 $g/m^2$, such as 58-71 $g/m^2$. A suitable thickness (measured according to ISO 534:2011) of the coated paper product is 55-70 μm, such as 57-67 μm. A suitable density (measured according to ISO 534:2011) for of the coated paper product is 950-1100 $kg/m^3$.

The coating typically slightly increases the puncture resistance of the material. Hence the puncture force at break (measured according to EN 14477) of the coated paper product may be at least 2.4 N, preferably at least 2.6 N.

The Bendtsen roughness (measured according to ISO 8791-2:2013) of the glazed side of the coated paper product is typically below 90 ml/min, preferably 70 ml/min or lower, more preferably below 55 ml/min. A typical lower limit may be 20 ml/min.

The PPS roughness according to ISO 8791-4:2007 of the glazed side of the coated paper product is typically below 6.0 µm, preferably below 5.0 µm, such as below 4.0 µm. A typical lower limit may be 1.5 µm. In one embodiment, the glazed side is coated to prevent curl. Such a coating is typically thin, e.g. <2.0 g/m². The curl-preventing coating may be a starch coating. Alternatively, only water is applied in the curl-preventing coating step. The glazed side is normally not barrier-coated. As understood by the skilled person, a thin curl-preventing coating (such as a starch coating of less than 2.0 g/m²) is not considered to a barrier coating. Accordingly, the glazed side is normally not covered by a polyethylene (PE) film.

As explained herein, selecting an MG paper as the paper substrate results in a relatively strong material. The tensile strength index (measured according to ISO 1924-3:2005) of the coated paper product may be at least 70.0 Nm/g in the MD and/or at least 41.0 Nm/g in the CD. A typical upper limit may be 105 Nm/g in MD and 65 Nm/g in CD. The TEA index (measured according to ISO 1924-3:2005) of the coated paper product may be at least 0.9 J/m² in the MD and/or at least 1.5 J/m² in the CD. A typical upper limit may be 1.35 J/m² in the MD and 2.25 J/m² in the CD.

Bending resistance is discussed above. The bending resistance (measured according to 2493-1:2010) of the coated paper product may be 20-40 mN in the MD and/or 16-32 mN in the CD. The bending resistance index (measured according to 2493-1:2010) of the coated paper product may be 75-155 Nm⁶/kg³ in the MD and/or 60-120 Nm⁶/kg³ in the CD.

As a second aspect of the present disclosure, there is provided a sealable material comprising a coated paper product according to the first aspect and a sealant layer, such as a cold-sealant layer, applied to the barrier-coated side of the coated paper product. Typically, the sealant layer is applied to only parts of the barrier-coated side of the coated paper product since only parts of the barrier-coated side is sealed to itself.

The sealable material may further comprise a print that has been printed onto the glazed side of the coated paper product. A lacquer may be provided on the print, e.g. to modify gloss, friction and/or release properties.

Otherwise, the examples and embodiments discussed above in connection to the first aspect apply to the second aspect mutatis mutandis.

As a third aspect of the present disclosure, there is provided a packaging method comprising the steps of:
  a) applying a sealant layer to the barrier-coated side of a coated paper product according to the first aspect to obtain a sealable material; and
  b) flow-wrapping a product in the sealable material.
  In an embodiment, the sealant layer is only applied to part of the barrier-coated side of the coated paper product in step a). As understood by the skilled person, step b) comprises sealing.

Step a) may further comprise printing the glazed side of the coated paper product. The printing and the application of the sealant layer may be carried out in the same machine.

Otherwise, the examples and embodiments discussed above in connection to the first and the second aspect apply to the third aspect mutatis mutandis.

As a fourth aspect of the present disclosure, there is provided a method of producing a coated paper product for use in a flow wrapping process, comprising the steps of:
  providing a paper substrate having an air permeance measured according to ISO 5636-5:2013 of at least 55 s, said paper substrate being a machine-glazed (MG) kraft paper having a glazed side and a non-glazed side;
  precoating the non-glazed side of to form a precoating layer comprising a polymeric binder and a pigment; and
  barrier-coating the precoating layer to form a barrier coating layer forming a surface,
wherein the contact angle measured according to TAPPI T 558 between water and the surface formed by the barrier coating layer is less than 90° at the 1.0 s checkpoint.

The precoating step and the barrier-coating step are normally dispersion coating steps.

In one embodiment, the method comprises drying between the precoating step and the barrier-coating step.

The method of the fourth aspect may be followed by the method of the third aspect. The examples and embodiments discussed above in connection to the first, second and third aspects apply to the fourth aspect mutatis mutandis.

A typical product to be packed in the paper-based material of the present disclosure is a protein bar, a snack bar or a chocolate bar.

EXAMPLES

After having established the above-mentioned criteria, the present inventors set out to develop a suitable paper-based material. It was decided that the paper-based material should comprise a paper substrate and at least one barrier layer.

After considering various options, the inventors settled for a machine-glazed (MG) kraft paper produced from never-dried bleached softwood (SW) pulp as the paper substrate. One reason for selecting such a paper was its strength. Another reason was its low porosity and dense surface structure. The properties of a suitable example of an MG paper is shown in table 1 below.

TABLE 1

| Properties of a MG kraft paper produced from never-dried bleached SW pulp. | | | |
| --- | --- | --- | --- |
| Property | Unit | Standard method | Value |
| Grammage | g/m² | ISO 536 | 48.15 |
| Thickness | µm | ISO 534 | 56.80 |
| Density | kg/m³ | ISO 534 | 847.71 |
| Tensile Strength MD | kN/m | ISO 1924-3 | 4.40 |
| Tensile Strength CD | kN/m | ISO 1924-3 | 2.50 |
| Tensile Index MD | kNm/kg | ISO 1924-3 | 91.38 |
| Tensile Index CD | kNm/kg | ISO 1924-3 | 51.92 |
| Stretch at break MD | % | ISO 1924-3 | 1.85 |
| Stretch at break CD | % | ISO 1924-3 | 4.12 |
| TEA MD | J/m² | ISO 1924-3 | 53.75 |
| TEA CD | J/m² | ISO 1924-3 | 74.58 |
| TEA Index MD | J/g | ISO 1924-3 | 1.12 |
| TEA Index CD | J/g | ISO 1924-3 | 1.55 |
| Air resistance (Gurley) | s | ISO 5636-5 | 65.48* |
| PPS 1 MPa glazed side | µm | ISO 8791-4 | 5.80** |
| Bendtsen Roughness glazed side | ml/min | ISO 8791-2 | 34 |
| Bendtsen Roughness non-glazed side | ml/min | ISO 8791-2 | 254 |

TABLE 1-continued

Properties of a MG kraft paper produced from
never-dried bleached SW pulp.

| Property | Unit | Standard method | Value |
|---|---|---|---|
| Bending Resistance MD | mN | ISO 2493-1 | 22 |
| Bending Resistance CD | mN | ISO 2493-1 | 13 |
| Bending Resistance Index MD | $Nm^6/kg^3$ | ISO 2493-1 | 197.1 |
| Bending Resistance Index CD | $Nm^6/kg^3$ | ISO 2493-1 | 116.5 |
| Puncture Resistance Force | N | EN 14477 | 2.81 |
| Puncture Resistance Strain | mm | EN 14477 | 0.47 |
| Puncture Resistance Work | mJ | EN 14477 | 0.58 |

*In other batches, the value has been higher and the average value is about 85 s.
**Unusually high, the value is normally between 2.4 and 4.1 μm.

The International Association of the Deinking Industry (INGEDE) was assigned to test an MG paper corresponding to that of table 1 according the criteria set forth by PTS Method RH: 021/97. Based on the test results, INGEDE concluded that the MG paper is rated as "recyclable".

Further, Ecol Studio S.p.A was assigned to assess the level of recyclability of an MG paper corresponding to that of table 1 according to the standard UNI 11743:2019 (including evaluation of test results in accordance with the Aticelca Evaluation Method 501:2019). In such an assessment, a material is classified as recyclable or non-recyclable based on five different tests. Further, there are four sublevels of recyclability (level A+, A, B, C). The result of the assessment was that the MG paper was classified as level A recyclable.

The inventors experimented with coatings on the glazed side and the non-glazed side of the MG paper. To some surprise, it was found that applying the coating onto the glazed side did not result in significantly better barrier properties than applying the coating onto the non-glazed side. Hence, it was decided to coat the non-glazed side and make the glazed side the "printing side". This was a breakthrough since the desired printing properties were obtained without further treatment of the paper substrate.

The inventors realized that advantageously, it should be possible to print the printing side and apply a sealant layer to the other side in existing machinery. For adherence of the sealant composition applied in such a machinery, the coated side of the paper-based material should be wettable. There are many different barrier coating compositions that can provide the desired combination of water vapor- and grease barrier properties and wettability. One such barrier coating composition is Barrikote 2052 from IMERYS. However, barrier coating compositions are generally expensive. Therefore, the present inventors set out to develop a precoating that reduces the amount of barrier coating needed for sufficient barrier properties. After experimenting with different precoating compositions, the present inventors settled for a composition comprising a polymeric binder, a pigment and a rheology modifier. One reason for including the pigment is that it is cheaper than the polymeric binder. Without being bound by any particular scientific theory, the present inventors also believe that the inclusion of pigments also results in a more effective filling of the pores of the paper substrate surface, which reduces the amount of barrier chemicals needed and facilitates repulping during recycling.

Further, the present inventors found that a hyper-platy pigment such as Barrisurf LX form IMERYS resulted in better barrier properties than a non-platy pigment such as Hydragloss 90 from KaMin. The optimal proportion (dry weight) of pigment to binder was found to be 100:75. When the proportion of binder was higher (100:100), the runnability in the coater was not as good. When the proportion of binder was lower (100:20), the barrier properties decreased.

Trinseo XZ 94378 (a styrene-butadiene co-polymer) was selected as the polymeric binder.

After experimenting with different coat weights, the inventors settled for 7.5 $g/m^2$ for both the precoating layer and the barrier coating layer.

Accordingly, a coated paper product intended for use in a flow wrapping process was prepared by coating a paper substrate according to Table 1 above. In the coating process, the glazed side was coated with starch (≤1 $g/m^2$ dry weight) for curl prevention. The non-glazed side was coated in two steps with intermediate drying. The coaters used for the steps were blade coaters. In the first step, a precoating composition was applied. The precoating composition comprised Trinseo XZ 94378 (polymeric binder), Barrisurf LX (pigment) and Rheocoat 2121 (rheology modifier). The dry weight ratio of polymeric binder to pigment was 75:100. The amount of rheology modifier was such that the viscosity of the precoating composition was 700 mPa*s. The dry amount of precoating applied in the first step was about 7.5 $g/m^2$.

After the precoating step, the precoated paper substrate was dried by IR and a drying cylinder. The precoated and dried paper substrate was then barrier-coated in the second step. The barrier coating composition was Barrikote 2052. Its viscosity was adjusted to 1200 mPa*s using the rheology modifier Rheocoat 35. The dry amount of barrier coating applied in the second step was about 7.5 $g/m^2$. After the second step, drying by IR, hot air and a drying cylinder was carried out to obtain the coated paper product intended to be printed and provided with a sealant layer and then used in a flow wrapping process. Properties of the coated paper product are shown in table 2 below.

TABLE 2

| Property | Unit | Standard method | Value |
|---|---|---|---|
| Grammage | $g/m^2$ | ISO 536 | 64.08 |
| Thickness | μm | ISO 534 | 62.40 |
| Density | $kg/m^3$ | ISO 534 | 1026.9 |
| Tensile Strength MD | kN/m | ISO 1924-3 | 4.94 |
| Tensile Strength CD | kN/m | ISO 1924-3 | 3.10 |
| Tensile Index MD | kNm/kg | ISO 1924-3 | 77.09 |
| Tensile Index CD | kNm/kg | ISO 1924-3 | 48.38 |
| Stretch at break MD | % | ISO 1924-3 | 2.08 |
| Stretch at break CD | % | ISO 1924-3 | 4.99 |
| TEA MD | $J/m^2$ | ISO 1924-3 | 70.18 |
| TEA CD | $J/m^2$ | ISO 1924-3 | 113.86 |
| TEA Index MD | J/g | ISO 1924-3 | 1.10 |
| TEA Index CD | J/g | ISO 1924-3 | 1.78 |
| PPS 1 MPa glazed/printing side | μm | ISO 8791-4 | 2.96 |
| Cobb 60 s | $g/m^2$ | ISO 535 | ~24 |
| Bending Resistance MD | mN | ISO 2493-1 | 30 |
| Bending Resistance CD | mN | ISO 2493-1 | 24 |
| Bending Resistance Index MD | $Nm^6/kg^3$ | ISO 2493-1 | 114.0 |
| Bending Resistance Index CD | $Nm^6/kg^3$ | ISO 2493-1 | 91.2 |
| Puncture Resistance Force | N | EN 14477 | 2.99 |
| Puncture Resistance Strain | mm | EN 14477 | 0.49 |
| Puncture Resistance Work | mJ | EN 14477 | 0.64 |
| Water contact angle 0.1 s coated side | ° | TAPPI T 558 | 64.0 |
| Water contact angle 1.0 s coated side | ° | TAPPI T 558 | 63.4 |
| Water contact angle 5.0 s coated side | ° | TAPPI T 558 | 61.1 |
| WVTR 23° C./50% RH | $g/m^2$*d | ISO 15106-1 | ~4 |
| WVTR 30° C./80% RH | $g/m^2$*d | ISO 15106-1 | ~25 |
| Grease Resistance, Palm Kernel Oil | min | ISO 16532-1 | >1500 |
| Whiteness | — | ISO 11475 | ~69 |
| Brightness | % | ISO 2470 | ~77 |

In table 2, the WVTR and Grease Resistance values represent satisfactory barrier properties. The PPS value reflects satisfactory printing properties. The water contact angles reflect the ability to be coated with a sealant layer. A successful application of a cold sealant layer has been confirmed in full-scale machine trials.

A coated paper product prepared according to the above was tested by an operator of a flow wrapping process. According to the operator, the runnability of the coated paper product was better than that of previously tested paper-based materials. Further, it resulted in satisfactory flow wrap packages.

The International Association of the Deinking Industry (INGEDE) was assigned to test a coated paper product prepared according to the above according the criteria set forth by PTS Method RH: 021/97. Based on the test results, INGEDE concluded that the coated paper product is rated as "recyclable".

Further, Ecol Studio S.p.A was assigned to assess the level of recyclability of a coated paper product prepared according to the above according to the standard UNI 11743:2019 (including evaluation of test results in accordance with the Aticelca Evaluation Method 501:2019). As also explained above, a material is classified as recyclable or non-recyclable based on five different tests in such an assessment. Further, there are four sublevels of recyclability (level A+, A, B, C). The result of the assessment was that the coated paper product was classified as level A recyclable.

The invention claimed is:

1. A coated paper product for use in a flow wrapping process, wherein:
   said coated paper product comprises a paper substrate;
   said paper substrate is a machine-glazed (MG) kraft paper having a glazed side and a non-glazed side;
   said non-glazed side is coated with a precoating layer and a barrier coating layer;
   said precoating layer comprises a polymeric binder and a pigment;
   a contact angle measured according to TAPPI T 558 between water and a surface formed by the barrier coating layer is less than 900 at the 1.0 s checkpoint; and
   the coated paper product is classified as recyclable according the criteria set forth by PTS Method RH: 021/97.

2. The coated paper product of claim 1, wherein a coat weight of the precoating layer is at least 5 g/m².

3. The coated paper product of claim 1, wherein a grammage measured according to ISO 536:2020 of the paper substrate is 40-60 g/m².

4. The coated paper product of claim 1, wherein a grammage measured according to ISO 536:2020 of the coated paper product is 56-76 g/m².

5. The coated paper product of claim 1, wherein a puncture force at break measured according to EN 14477 of the coated paper product is at least 2.4 N.

6. The coated paper product of claim 1, wherein the pigment is a platy pigment.

7. The coated paper product of claim 6 wherein the platy pigment has a form factor of at least 20.

8. The coated paper product of claim 1, wherein a dry weight ratio of pigment to binder in the precoating layer is between 100:40 and 100:90.

9. The coated paper product of claim 1, wherein a PPS roughness according to ISO 8791-4:2007 of the glazed side of the coated paper product is below 6.00 μm.

10. The coated paper product of claim 1, wherein a Bendtsen roughness measured according to ISO 8791-2:2013 of the glazed side of the coated paper product is below 90 ml/min.

11. The coated paper product of claim 1, wherein a tensile strength index measured according to ISO 1924-3:2005 of the coated paper product is at least 70.0 Nm/g in the coated paper product's machine direction (MD) and/or at least 41.0 Nm/g in the coated paper product's cross direction (CD).

12. The coated paper product of claim 1, wherein the MG kraft paper comprises fibers, and at least 80 dry wt. % of the fibers used to form the paper substrate are never-dried.

13. A sealable material comprising the coated paper product according to claim 1 and a sealant layer is applied to part of the barrier coating layer of the coated paper product.

14. The sealable material of claim 13, further comprising a print that has been printed onto the glazed side of the coated paper product.

15. A packaging method comprising the steps of:
   a) applying a sealant layer to part of the barrier coating layer barrier coated side of the coated paper product according to claim 1 to obtain a sealable material; and
   b) flow-wrapping a product in the sealable material.

16. The packaging method of claim 15, wherein step a) further comprises printing the glazed side of the coated paper product, which printing is carried out in the same machine as the application of the sealant layer.

17. A method of producing a coated paper product for use in a flow wrapping process, comprising the steps of:
   providing a paper substrate having an air permeance measured according to ISO 5636-5:2013 of at least 55 s, said paper substrate being a machine-glazed (MG) kraft paper having a glazed side and a non-glazed side;
   precoating the non-glazed side of to form a precoating layer comprising a polymeric binder and a pigment; and
   barrier-coating the precoating layer to form a barrier coating layer forming a surface,
   wherein the contact angle measured according to TAPPI T 558 between water and the surface formed by the barrier coating layer is less than 900 at the 1.0 s checkpoint, and wherein the coated paper product is classified as recyclable according the criteria set forth by PTS Method RH: 021/97.

* * * * *